(12) United States Patent
Tao et al.

(10) Patent No.: US 9,364,020 B2
(45) Date of Patent: Jun. 14, 2016

(54) AUTOMATED FRUIT AND VEGETABLE CALYX OR STEM REMOVAL MACHINE

(71) Applicants: Yang Tao, North Potomac, MD (US); John Lin, Cabin John, MD (US); Xin Chen, Rockville, MD (US); Gary E. Seibel, Taylorsville, MD (US)

(72) Inventors: Yang Tao, North Potomac, MD (US); John Lin, Cabin John, MD (US); Xin Chen, Rockville, MD (US); Gary E. Seibel, Taylorsville, MD (US)

(73) Assignees: California Strawberry Commission, Watsonville, CA (US); University of Maryland, College Park, MD (US)

(*) Notice: Subject to any disclaimer, the term of this patent is extended or adjusted under 35 U.S.C. 154(b) by 120 days.

(21) Appl. No.: 14/212,181

(22) Filed: Mar. 14, 2014

(65) Prior Publication Data

US 2014/0272055 A1 Sep. 18, 2014

Related U.S. Application Data

(60) Provisional application No. 61/790,303, filed on Mar. 15, 2013.

(51) Int. Cl.
| | |
|---|---|
| *A23N 15/02* | (2006.01) |
| *A23L 1/212* | (2006.01) |
| *B26D 5/00* | (2006.01) |
| *B26D 5/34* | (2006.01) |
| *B26D 7/06* | (2006.01) |
| *B26F 3/00* | (2006.01) |

(52) U.S. Cl.
CPC ............... *A23N 15/02* (2013.01); *A23L 1/2123* (2013.01); *B26D 5/00* (2013.01); *B26D 5/34* (2013.01); *B26D 7/0625* (2013.01); *B26F 3/004* (2013.01)

(58) Field of Classification Search
CPC .......... B26D 5/00; B26D 5/34; B26D 7/0625; B26F 3/004; C23N 15/02; A23L 1/2123
See application file for complete search history.

(56) References Cited

U.S. PATENT DOCUMENTS

| 4,138,940 | A | | 2/1979 | Fujii | |
|---|---|---|---|---|---|
| 4,472,444 | A | | 9/1984 | Studer et al. | |
| 4,519,193 | A | * | 5/1985 | Yoshida | ................. A01D 46/24 348/89 |
| 4,873,644 | A | * | 10/1989 | Fujii | ...................... A01D 46/24 56/10.2 R |
| 5,590,591 | A | * | 1/1997 | Kim | ......................... A23N 4/12 99/472 |
| 5,865,111 | A | * | 2/1999 | Hanson | .................. A23N 15/04 99/546 |
| 6,610,953 | B1 | * | 8/2003 | Tao | ......................... B07C 5/342 209/11 |

(Continued)

FOREIGN PATENT DOCUMENTS

| EP | 1981852 | * | 2/2008 |
|---|---|---|---|
| JP | 57-194777 | * | 11/1982 |

(Continued)

*Primary Examiner* — Anthony Weier
(74) *Attorney, Agent, or Firm* — Rutan & Tucker, LLP; Hani Z. Sayed

(57) ABSTRACT

A process for automated high-throughput fruit or vegetable calyx removal includes a material handling system, a vision system, and a cutting system. The material handling system is capable of transporting the fruit or vegetable through the automated process. The material handling system may also orient the fruits or vegetables along an axis of the fruit and or align the fruit or vegetables in a desired pattern, orientation, and/or configuration. The vision system identifies the calyx and determines calyx position data and optimal cutting angle for individual fruit. The cutting system uses data received from the vision system to automatically remove the calyx from the fruit or vegetables.

4 Claims, 11 Drawing Sheets

(56) References Cited

U.S. PATENT DOCUMENTS

| | | | |
|---|---|---|---|
| 2003/0187808 A1 | 10/2003 | Alfred et al. | |
| 2008/0289515 A1* | 11/2008 | Knorr | A23N 15/02 99/640 |
| 2009/0217793 A1 | 9/2009 | Spillner et al. | |
| 2011/0293797 A1* | 12/2011 | Pryor | A23N 15/003 426/231 |
| 2012/0050786 A1 | 3/2012 | Rudolph et al. | |
| 2013/0064950 A1 | 3/2013 | Randazzo | |

FOREIGN PATENT DOCUMENTS

| | | | |
|---|---|---|---|
| JP | 57-208976 | * | 12/1982 |
| JP | 6-277025 | * | 6/1994 |

* cited by examiner

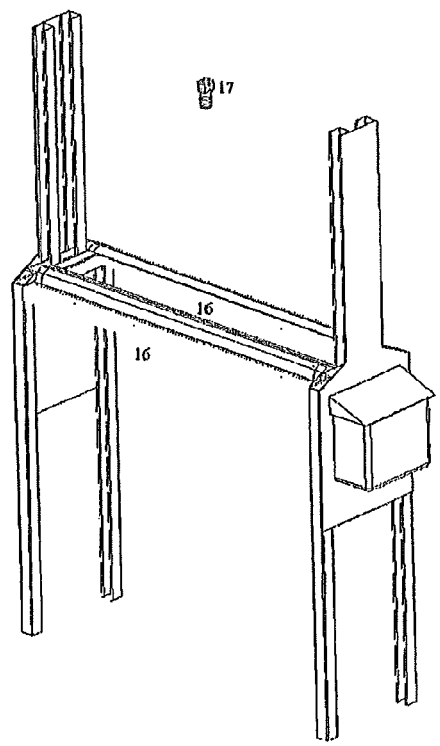
Figure 3
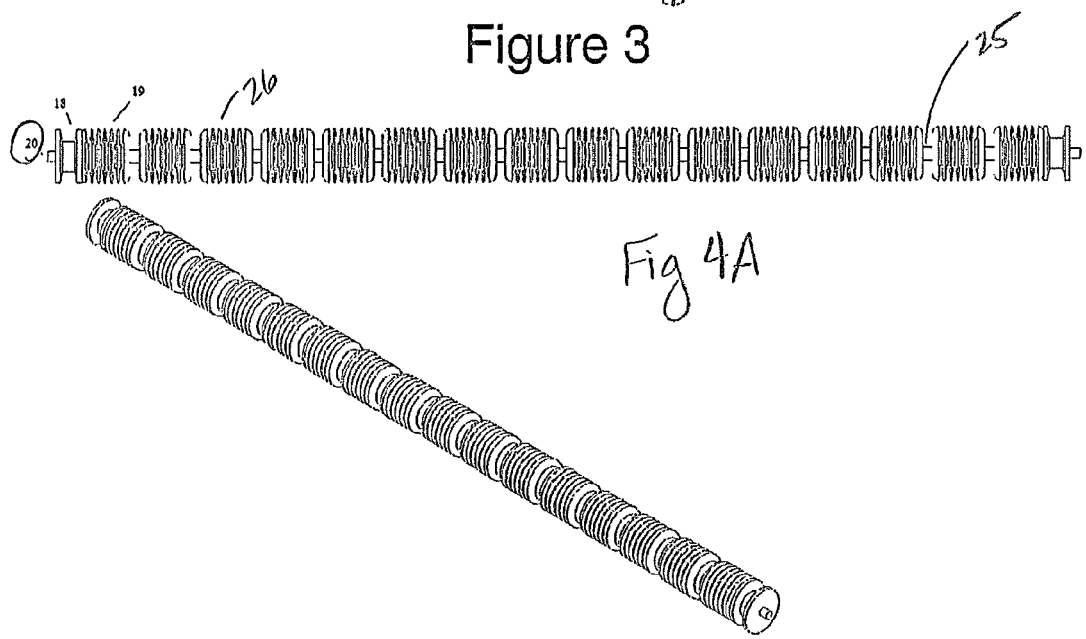
Fig 4A
Figure 4B

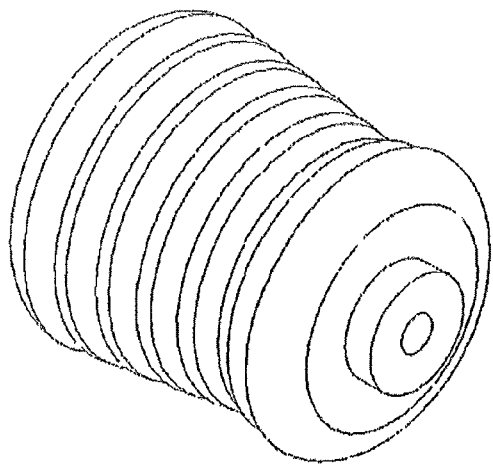
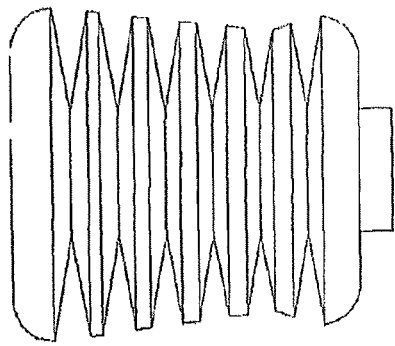
FIG. 5A   FIG. 5B
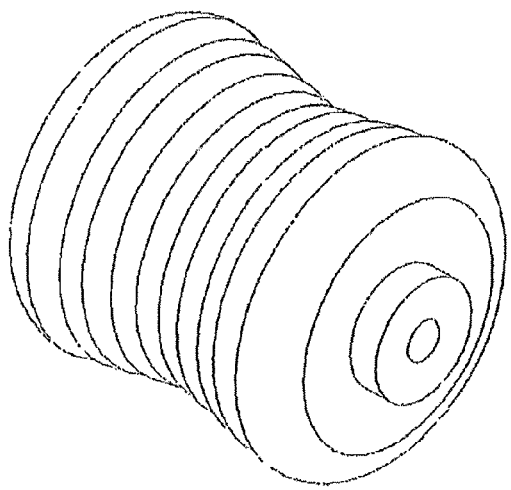
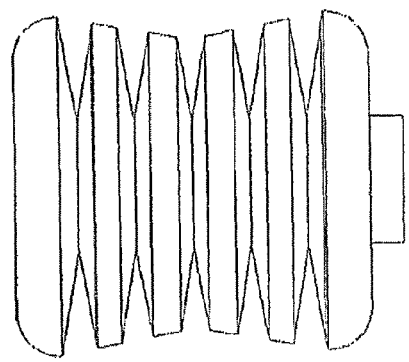
FIG. 6A   FIG. 6B

After Roller Rotation

AUTOMATED FRUIT AND VEGETABLE CALYX OR STEM REMOVAL MACHINE

CROSS REFERENCE TO RELATED APPLICATIONS

The present application claims priority to U.S. Provisional Application No. 61/790,303, filed Mar. 15, 2013 and titled "Automated Fruit and Vegetable Calyx/Stem Removal Machine," which is incorporated in its entirety herein.

TECHNICAL FIELD

The present invention related to the field of high-throughput food processing equipment, and in particular to the removal of an undesired portion of a fruit or vegetable. The machine and methods disclosed herein are especially suitable for removing the calyx from strawberries before they are flash frozen.

BACKGROUND

Trailing only grapes, strawberries are the second largest non-citrus fruit specialty crop in the United States, with 2011 production values at $2,204,235,000 (USDA National Agricultural Statistics Service (NASS), 2012). Strawberry production involves repeated-fruit bearing and multiple harvests per season, making strawberries the highest tonnage per acre (25 tons/acre) crop among all fruits (USDA NASS 2012).

Strawberries are consumed fresh, as well as processed into many foods, such as ice cream, yogurt, juices, jams, jellies, and baked goods. For strawberries harvested for the processing market, the calyx (the stem cap with green crown leaves) must be removed before freezing to prevent the final product from containing any inedible crown leaves or caps. Currently, field-harvesters use a hand-held cutting tool to remove the calyx. This especially labor-intensive process add an additional 45-50% to the time required for fruit picking. In addition, the strawberry growers face significant challenges in finding field workers willing to use the sharp hazardous instruments for harvesting. Furthermore, the cutting tools are reused many times without sanitizing which may serve as a vehicle for pathogen contamination.

By relocating the calyx removal process from the fields to the processing plants, this new practice is capable of cutting the field labor time significantly, improving overall management and logistics, and increasing throughput and yield. The strawberry industry has expressed interest in the development of an automated calyx removal system.

BRIEF SUMMARY

Embodiments include an automated machine capable of orienting the vast majority of strawberries, such as greater than 90%, identifying the calyx location and optimal cutting angle, and severing the calyx from the body using a high-pressure water jet stream.

A process for automated high-throughput fruit or vegetable calyx removal includes a material handling system, a vision system, and a cutting system. The material handling system is capable of lifting the fruits or vegetables out of water and transporting the fruit for vegetable through the automated process. The material handling system may also orient the fruit or vegetables along an axis of the fruit and or align the fruits or vegetables in a desired pattern, orientation, and/or configuration. The vision system uses one or more multiple image angles to locate calyx position data and optimal cutting angle for individual fruit. The multiple angles may come from a stationary imager of rotating fruit or vegetables or multiple imagers at various angles and orientations. The cutting system uses data received from the vision system to automatically remove the calyx from the fruit or vegetables. The cutting system may be an automated water jet cutting system that uses pipe flexibility to actuate a nozzle of the water jet cutting system along a separation path determined from the calyx position data and optimal cutting angle.

To this end, in an exemplary embodiment, a computer controlled strawberry pre-processing system, comprising: a vision system for sequentially imaging strawberries, the vision system configured to detect the location of the calyx for removal; a calyx removal system for separating the calyx from the strawberry based on the detected location from the vision system.

In another exemplary embodiment, further comprising: a loading system including a water tank and conveyor system to remove strawberries from the water tank and transport the strawberries through the vision system and calyx removal system, the conveyor system configured to rotate the strawberries along at least a portion of the transportation through the vision system.

In another exemplary embodiment, where the loading system comprises a frame including a track having an inclined section and a generally horizontal section, and a plurality of rods positioned along the track, the rods laterally movable from one end of the track to an opposing end of the track to laterally transport the strawberries through the pre-processing system.

In another exemplary embodiment, where the plurality of rods comprise a profiled outer perimeter configured to position and orient the strawberries in a desired pattern, at least a portion of the profiled outer perimeter includes a generally circumferential striated pattern along a longitudinal length of the profiled outer perimeter.

In another exemplary embodiment, wherein the profiled outer perimeter comprises shaped rollers positioned along shafts of the rods.

In another exemplary embodiment, wherein the rods comprise a frictional engagement surface that contacts a portion of the frame such that when the frictional engagement surface is in contact with the frame and the rod is translated along the frame the rods rotate and when the frictional engagement surface is not in contact with the frame and the rod is translated along the frame the rod does not rotate.

In another exemplary embodiment, wherein the vision system comprises at least one camera for capturing sequential images of the strawberries.

In another exemplary embodiment, wherein the calyx removal system comprises a bladeless pressure water knife.

In another exemplary embodiment, wherein the bladeless pressure water knife operates at a pressure from 25 kPSI to 35 kPSI.

In another exemplary embodiment, wherein the bladeless pressure water knife comprises a water nozzle coupled to an actuator such that the bladeless pressure water knife is translated along a separation path to remove a calyx from a strawberry.

Still another exemplary embodiment, a method of removing calyx from strawberries in a processing line, comprising: conveying a series of strawberries through the processing line; detecting the calyx of the series of strawberries with one or more sensors; cutting the calyx from the series of strawberries with a removal system.

In another exemplary embodiment, further comprising automatically orienting the series of strawberries and aligning the series of strawberries in a desired pattern for processing:

In another exemplary embodiment, wherein the one or more sensors comprises a camera that takes sequential images of the strawberries.

In another exemplary embodiment, further comprising processing the sequential images of the strawberries to automatically detect the calyx of the strawberry.

In another exemplary embodiment, wherein the removal system comprises a bladeless water pressure knife.

In another exemplary embodiment, further comprising calculating a separation path to traverse with the bladeless water pressure knife to separate the calyx from the series of strawberries.

In another exemplary embodiment, wherein the strawberries are rotated during the taking of sequential images to image various perspectives of the strawberries.

In another exemplary embodiment, wherein the strawberries are translated but not rotated when traversing the removal system for cutting the calyx from the strawberries.

In another exemplary embodiment, wherein the removal system is computer controlled to automatically move the bladeless water pressure knife to the necessary location for separating the calyx from the strawberries.

Still another exemplary embodiment, a process for automated high-throughput fruit calyx removal, comprising: a material handling system capable of lifting the fruit out of water, orient the fruit along an axis of the fruit; a vision system that uses one or more image angles to locate calyx position data and optimal cutting angle for individual fruit; and an automated water jet cutting system that uses pipe flexibility to actuate a nozzle of the water jet cutting system along a separation path determined from the calyx position data and optimal cutting angle.

BRIEF DESCRIPTION OF THE DRAWINGS

FIG. 3 illustrates an exemplary internal view of the lighting system according to embodiments of the invention.

FIG. 4A illustrates a front view and FIG. 4B illustrates an isometric view of the conveyor rods used to orient and hold the produce.

FIG. 5A illustrates an isometric view and FIG. 5B illustrates a side view of an exemplary roller design according to embodiments of the invention.

FIG. 6A illustrates an isometric view and FIG. 6B illustrates a side view of an exemplary roller design according to embodiments of the invention.

DETAILED DESCRIPTION

Figure 1A:
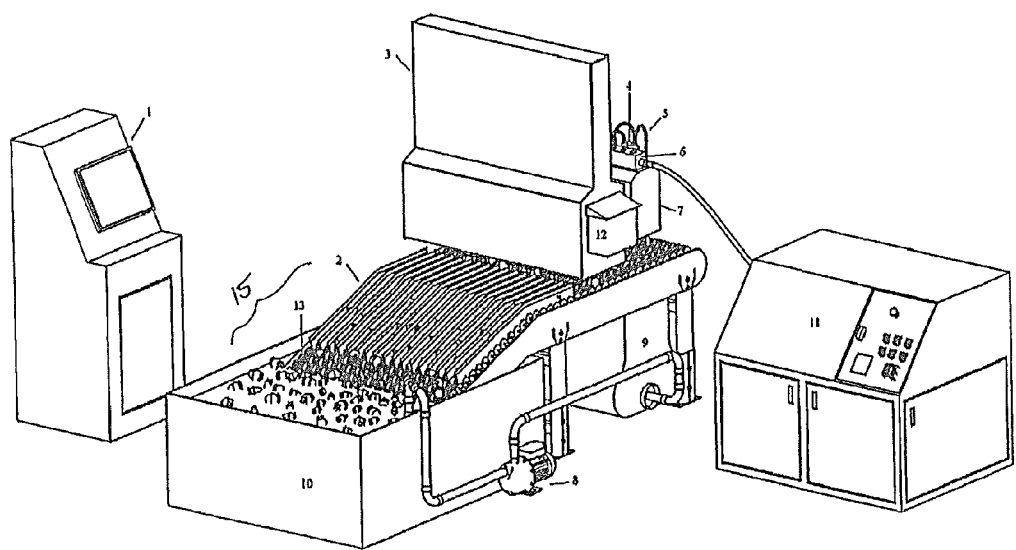
FIGS. 1A and 1B illustrate exemplary isometric views according to embodiments of the invention.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

In use, the worker takes a pallet of strawberries and places it in the water tank of the present invention. The machine will then automatically pick the strawberry up from the water tank and remove the calyx to a separate bin.

Thus, the exemplary system starts with a loading system for produce to prepare the fruit for processing. An inclined-to-horizontal type conveyor lifts the strawberries from a holding water tank. In an exemplary embodiment, the conveyor comprises holders, such as shaped rods or shafts, rollers, coiled roller, or other shaped bed with an outer profile where strawberries naturally gravitate to valleys of adjacent rods or bed. The rotation of the rollers allows the strawberry, or any suitable conical or geometrically polarized produce, to align between the rollers. The loading system may transport the strawberries from the holding tank to and through the processing system. The loading system may also locate and/or orient the strawberries in a desired alignment, orientation, position, elevation, etc.

When the fruit in rotation from the loading section comes into the vision section, an industrial imaging camera will take continuous images of the fruit surface and identify each calyx location. By the time the strawberries exit the viewing areas, multiple views of all calyxes will have been imaged and all calyxes will have been identified and precisely located. Since the rolling action is no longer needed, rotation will stop, and all strawberries will remain in their stationary lateral locations as they move to the calyx removal section. A conveyor shaft encoder will then precisely track produce location during travel. The computer will register each calyx's precise position in coordinates synchronized with the conveyor motion. While there are several calyx removal mechanisms, and exemplary embodiment uses a non-metal or blade-free removal machine that takes the coordinates from the vision system and removes each calyx in a precision cut, like a plotter. After the calyx removal, the caps will fall down in between the gaps of the conveyor rollers to be carried out in the collection bin.

Although embodiments of the invention may be described and illustrated herein in terms of removing the calyx from a strawberry, it should be understood that embodiments of this invention are not so limited, but are additionally applicable to removing any identifiable feature from an object where the object can be oriented by rolling, such as any conical or polarized shaped object. For example, other fruit, vegetable or foods may benefit from embodiments described herein, such as apples, tomatoes, carrots, berries, etc. Furthermore, although embodiments of the invention may be described and illustrated herein in terms of identifying a desired removal feature by continuous image, other analog or digital identification means can be used based on the desired identifiable feature. For example, infrared, magnetic, ultrasonic, electromagnetic, visual, optical, sonic, sensing methods may be used to identify the location of the portion to be removed. In addition, embodiments as described herein use a blade-free removal or non-metal removal system to remove the desired identifiable feature. However, other removal mechanisms may be used, such as cutting and/or blades, lasers, etc.

Figure 1B:
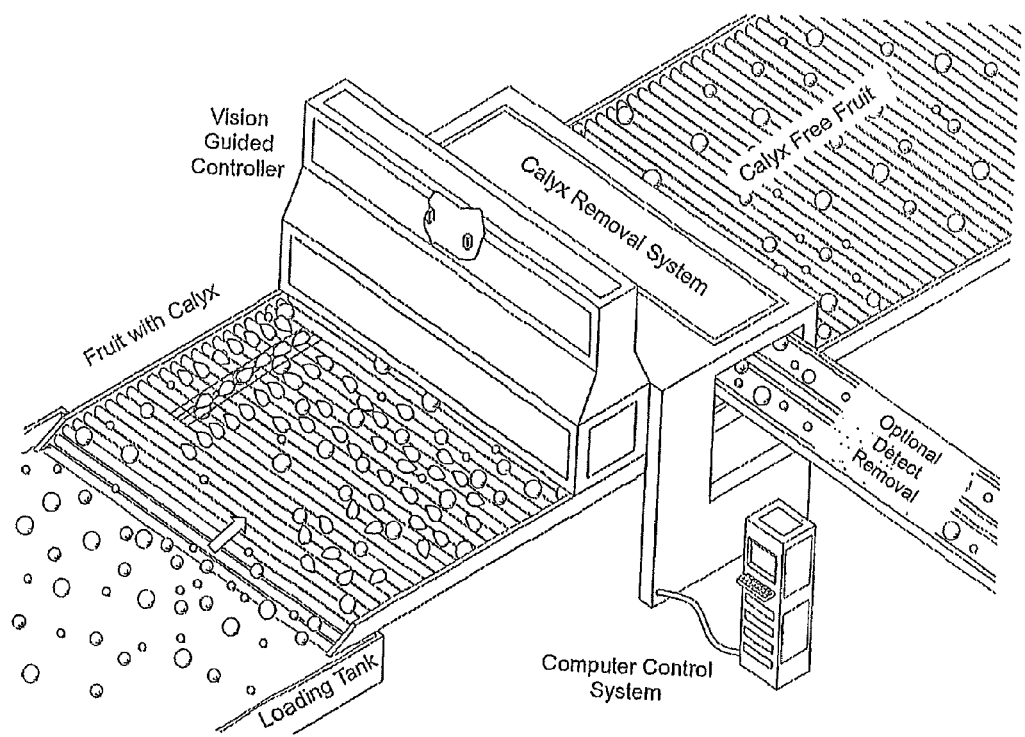

FIG. 1 illustrates an exemplary isometric view according to embodiments of the invention. As shown embodiments include a loading system 15, a machine vision system for calyx identification 3, and a calyx removal system 7. The machine vision system preferably identifies and locates the calyx through one or more sensors, such as instantaneous imaging and optics, so that the machine can detect all calyxes on either a moving or stationary conveyor, to provide strawberry and calyx parameters regardless of their positions, orientations, sizes, and speeds. Embodiments as described herein may be located and/or retrofitted at the beginning of conventional processing lines. For example, the system can run a throughput of 120 strawberries per second with sharp fine cut at the desired location with 1/16 inch precision to ensure yield.

The loading system 15 may include a storage tank 10 for receiving the strawberries retrieved from the fields, which include the calyx for removal. A conveyor system may be used to transport the strawberries from the storage tank and through the system including the calyx identification and calyx removal systems. The loading system 15 may be used to separate and orient the strawberries in a desired configuration. Thus, the strawberries may be oriented in a desired configuration, such as aligned in rows and/or aligned in orientation before entering the identification and removal systems. For example, the loading system 15 may separate strawberries generally into rows, such that single sequential strawberries are fed into the identification and/or removal systems for any cross-section of the system. In other words, a plurality of rows may be created across the identification and/or removal system such that a single strawberry may be fed into the system at any one row, but multiple strawberries may enter the system concurrently through multiple rows. The rows may be physically separated by one or more barriers. Alternatively, the loading system may be configured to position the strawberries to create rows without physical barriers. The loading system may also orient the strawberry is a desired configuration relative to the system and/or adjacent strawberries.

Figure 8:
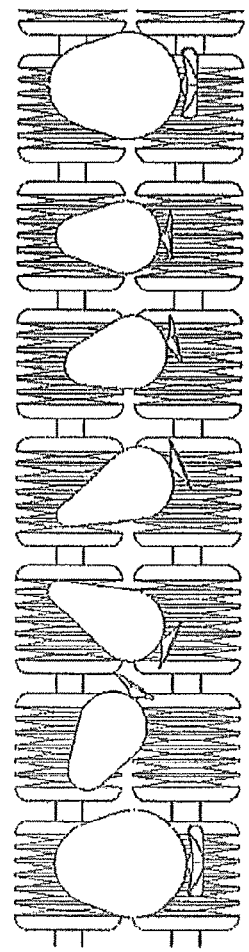
FIG. 8 illustrates an exemplary product reorientation through embodiments of the present invention.
Figure 8:
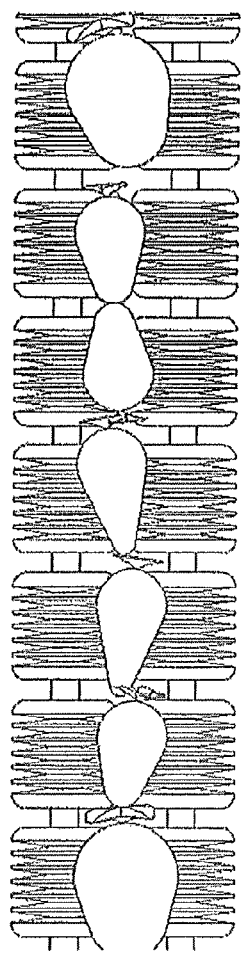

For example, the longitudinal line of the strawberry connecting the end of the strawberry through the calyx with an opposing end of the strawberry may be oriented relative to adjacent strawberries. Therefore, the longitudinal line of the incoming strawberries may be aligned generally parallel to adjacent strawberries, and/or generally perpendicular to the row of strawberries. Therefore, as seen in FIG. 8, for example, the calyx may be on one or two opposing sides of the strawberry as the strawberry enters the system, and not on a front or back of the strawberry as viewed from the removal system. The strawberries are oriented in the sideways position so the water jet of the exemplary removal system can more easily remove the calyx from the strawberry using the forward motion of the strawberry on the conveyor system. However, the loading system may be used to orient and position the strawberry in any desired configuration. For example, the calyx may be positioned facing toward or away from the removal system (or in line with the strawberry conveyor direction), on either of opposing sides of the strawberry as the strawberries enter the removal system (or exterior sides of the strawberry compared to the conveyor direction, as exemplified in FIG. 8), on a top or bottom of the strawberry, or any orientation or combination of orientations in between, such that the imaging and removal system has a starting context for presuming an orientation of the incoming strawberry. Thus, the loading system may be configured to take the strawberries from a random orientation upon loading or removal from the water tank and reorient them into a desired uniform orientation, alignment, position, for further processing by the vision system and removal system. The loading and conveyor system preferably runs a through put of approximately 120 strawberries per second or about 12,000 pounds per hour to accommodate the strawberry production at peak season, around June.

The machine vision system for calyx identification 3 identifies the position of the strawberry and/or calyx to determine where to make the separation of the calyx from the strawberry. The identification system 3 may take one or more images or scans of the strawberry as it passes through the vision system. Although described in terms of a vision system, the detection, location, and orientation determination of the vision system does not have to be visual or spectral. Instead, a range of systems may be used to determine the location and/or orientation. For example, one or more sensors, such as optical (visual, infrared, ultraviolet, etc.), sonic, tactile, pressure, etc. may be positioned along or around one or more rows of incoming strawberries to determine the location of the calyx relative to the strawberry to calculate a separation position for the calyx removal system.

The machine vision system may be used in conjunction with the loading system to determine the location and/or orientation of the strawberry features. For example, if the loading system orients and aligns the strawberries in an expected way, then the machine vision system merely needs to identify specific parameters associated with the assumptions permitted based on the loading system. Therefore, if the loading system orients the incoming strawberries parallel to each other and perpendicular to the respective row, then the calyx will be positioned at one of either opposing ends of the strawberry, i.e. on a side of the row. Therefore, the machine vision system merely scans from one end of the row until it detects the presence of an object. The terminal end of the object may be detected, inspected, and determined to contain the calyx or not. Once determined, the location relative to the side of the row can be determined, thus locating the calyx relative to a location of the system. The system may then scan or image the end region adjacent the calyx to determine an optimal separation location and/or trajectory. Alternatively, or in addition thereto, the machine vision system may fully scan or image the strawberry to determine the location, orientation, and/or separation location.

The calyx removal system 7 may be any mechanism for removing the identified calyx from the strawberries, such as blade, laser, waterjet knife, non-blade systems, or other cutting or removal system. In the case of non-food processing using the same exemplary process for removing a portion of a polarized object, other cutting or removal systems may be used as well, such as sand or grit blasting. In an exemplary embodiment, the calyx removal system 7 may include synchronized waterjet knife or non-blade removal water jets with an optional fixed or motional configuration. The calyx removal system 7 may be fixed, such that a number of removal mechanisms are provided and selectively activated based on the identified position of the calyx for removal. Alternatively, the removal mechanism may be motional such that the orientation and/or location of the cutting device may be translated and/or angularly oriented. For example, the removal system may translate in two dimensions such that the cutting device may move to a desired longitudinal position of the strawberry to remove a desired terminal end of the strawberry.

Figure 13:
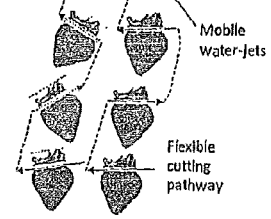
FIG. 13 illustrates exemplary separation paths by either stationary or motional removal systems.
Figure 13:
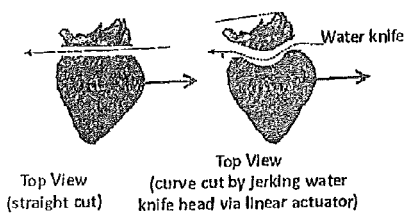

FIG. 13 illustrates exemplary separation paths by either stationary or motional removal systems. The cutting device may remain stationary during cutting to create a line across the strawberry perpendicular to the motion of the strawberry as the strawberry is conveyed through the removal system. Alternatively, the cutting device may translate during cutting such that a linear and/or curved section may be removed from the terminal end of the strawberry in an attempt to preserve the most fruit remaining on the strawberry. For example, the cutting device may move inward toward the center of the strawberry to remove more of the calyx along the center of the strawberry and move outward after passing the center of the strawberry to leave more of the fruit for freezing. The cutting device may also be oriented angularly such that a conical or other shaped cut may be made at the end of the strawberry. The system may be configured such that the strawberry is traversing the removal system while being cut or may be stationary during the cutting procedure, before being moved out of the removal system. Thus, the conveyor system and the removal system may work in conjunction to determine the precise location and desired cutting location within the calyx removal system. The calyx cut is preferably sharp and maintains a yield loss comparable or less than the presently used manual system.

The custom pressure pump 11 uses minimum water relative to the average daily usage of a produce processing plant. Water may also be recycled from the water collecting tank 9 back into the water tank 10 for strawberry cleaning purposes. This is performed by a simple external pump 8.

The system uses the images or scans from the machine vision system to determine a location and/or orientation of the strawberry and/or calyx. The system may also or alternatively determine a location and/or trajectory for the calyx removal system. The system comprises hardware and/or software stored as non-transitory machine-readable language and executed by a processor to perform the desired location, orientation, and/or trajectory. The control panels 1, 12 house the electronics necessary to control and drive the moving parts of the machine. Adjustments can be programmed into the system by the user to adapt for different strawberry varieties and/or configurations. The controls also permits a user to adjust the vision system and cutting schemes. The controls may, for example, include a touch screen the permits a user to set various parameters, cut as speed, cutting route schemes, etc.

Once the machine is turned on, the user will place strawberries into the water tank 10. Floating strawberries are then lifted from the water by the valley of adjacent roller rods 13. Strawberries are then simultaneously singulated and oriented. Dividing fins 2 cause the singulation. Roller rotation causes the orientation of the strawberry and other geometrically similar items. The singulated and oriented strawberries enter the vision system 3. The strawberries continue to roll while being imaged multiple times. This provides accurate data on strawberry calyx location and optimal cutting angle to minimize meat loss. This data is used to coordinate the automated waterjet cutting nozzles 24. Severed calyx tops fall between the rollers and are subsequently removed by a separate conveyor system. Freshly de-crowned strawberries may then be processed (i.e. flash frozen) immediately.

The loading system 15 comprises a frame and conveyor as illustrated in FIGS. 2, and 4-8. The conveyor system preferably automatically polarizes the fruit, such that adjacent fruit are oriented generally parallel. The conveyor system preferably comprises an elevating section 22 that may be positioned within current water tanks already in use in strawberry processing plants. The elevating section 22 is configured to lift floating strawberries from the water on a conveyor system. The conveyor system may comprise any moving system, but as shown and described, a rod conveyor is used. The conveyor system allows one layer of fruit to be processed.

Figure 2:
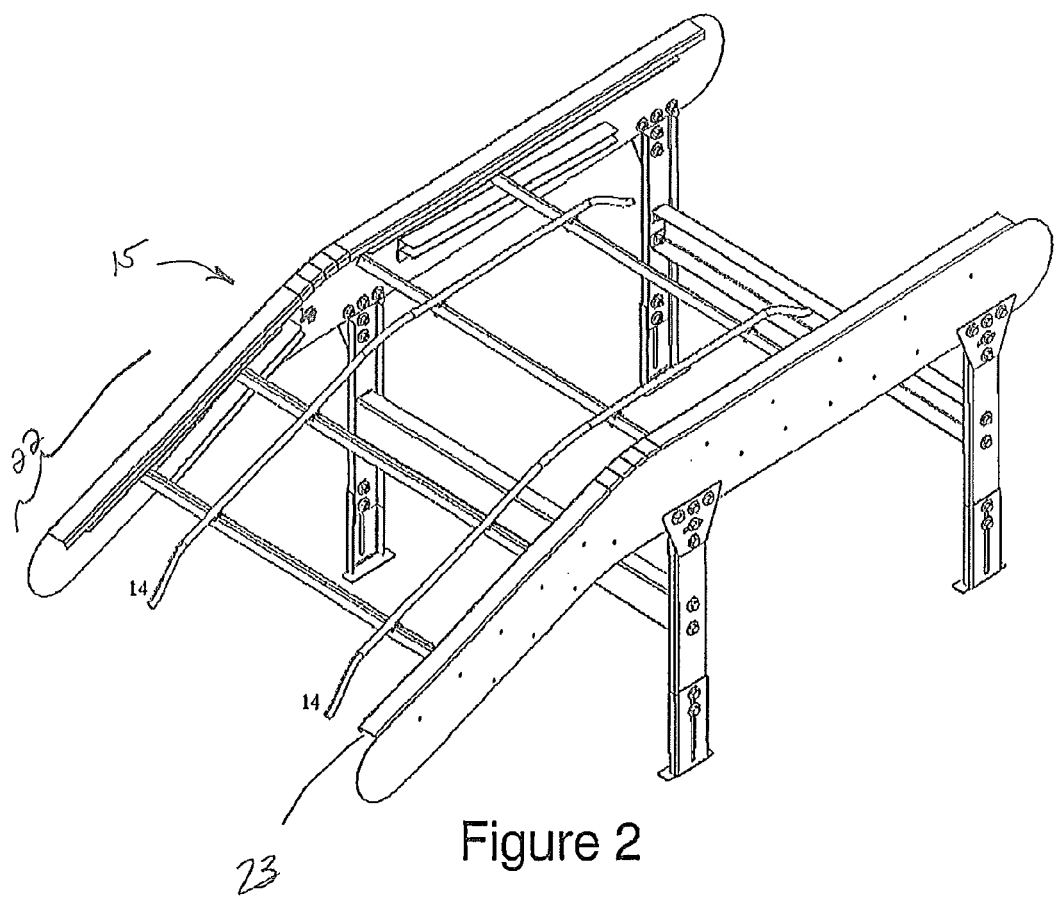
FIG. 2 illustrates an exemplary isometric view of a conveyor frame according to embodiments of the invention.

FIG. 2 illustrates an exemplary isometric view of a conveyor frame according to embodiments of the invention. The frame contains two bars 14 that include the elevating section and a generally horizontal section. The elevating section is configured to position in the water tank 10, with the end of the frame below the water's surface and the top of the elevating section 22 and horizontal section positioned above the water's surface. The frame includes outer tracks 23 that engage and/or support the terminal ends of rods 19. The frame includes one or more internal tracks, two bars 14 illustrated, that contact rolling points 18 of the roller rods 19. The friction from the track 14 and the contact points 18 causes the rotation of the entire roller rod 19.

The fruit sits in the valleys of the outer profile of the rollers and/or shaped rod to position and orient the fruit for processing. The rotation of the rods along the frame will enable to fruit to orient and rotate such that they fall within the outer profile or cup of the rollers and/or rod. After the fruit leaves the vision system, as described more fully below, the tracks 14 may terminate or ramp downward such that the contacting points 18 are separated from friction portions on the rods. Without the frictional engagement, the rods no longer rotate and the relative position of the strawberries is maintained and translationally tracked with the conveyor shaft encoder.

FIG. 4A illustrates a front view and FIG. 4B illustrates an isometric view of the conveyor rods 19 used to orient and hold the produce. The rod may include a central shaft from which a profiled projection may radially extend. The profiled projection may be shaped rollers that are configured to rotate with the shaft 25 and are profiled to use the strawberry's polarized shape to orient the strawberry in a desired configuration. The respective rollers may be separated such that rows are created as the strawberries are aligned and oriented by the rollers. The conveyor rods 19 may include a conveyor shaft encoder 20 that interacts with the frame and/or track 23 such that the position of the conveyor rod 19 may be tracked. The rollers 26 and/or profile of the rod 19 may be configured to accommodate the average or common shape of a strawberry so that the strawberries are oriented with their longitudinal center generally parallel to the ground and perpendicular to a vertical cutting mechanism. The rollers 26 and/or profile of the rob 19 may also encourage separation and desired spacing between the strawberries, such that the strawberries may be aligned and oriented for more efficient identification and removal systems.

Figure 11A:
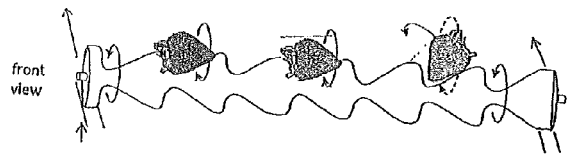
FIG. 11 illustrates an exemplary front view (FIG. 11A) and top view (FIG. 11B) wq2 of adjacent roller rods according to embodiments of the invention.
Figure 11B:
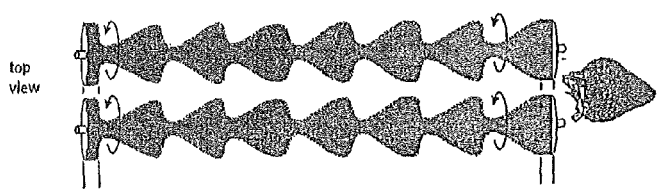

FIGS. 5-7, 11, and 14-16 illustrate exemplary designs for orienting the strawberries such that a longitudinal length of the strawberry from the calyx end to the opposing end generally align or are parallel with adjacent strawberries and the axis of the roller shafts. FIGS. 5-7 illustrate different variations of the roller design used to both cup and rotate the strawberries and other geometrically similar items. FIG. 11 similarly shows a shaped profile rod 19. The rollers may be configured such that a strawberry is oriented between rollers on adjacent shafts and separated between adjacent rollers on the same shaft. Alternatively, two adjacent rollers on the same shaft may cooperate to orient a strawberry. Thus, generally 2 or 4 rollers are used to orient the strawberry on two separate shafts. The outer profiles vary between the exemplary rollers. The exemplary rollers may be made of metal, plastics, or metal wire, for example. The construction shape can be made from solid rods, cylindrical tubes, disks of varying radii, metal rings, wrapped or coiled wires, or shaped meshes that form the outer profile of the roller.

The rollers create an outer profile for orienting the strawberries as described. The rollers may also include a striated pattern such as through cuts, slits, or openings generally circumferentially disposed around the roller and positioned along the longitudinal length of the roller. The striated pattern creates peaks along the roller that creates an outer profile to orient and position the strawberries, while the valleys provide a water path for the removal system to reduce spray and splash back. The striated pattern shown in the designs are used to minimize splash back during the waterjet cutting section. The pattern also decreases the amount of rotational movement of the rollers when passing under the waterjet cutting stream. The pattern also provides a path to the discharge conveyor for any undesirable material to pass from the roller and out of the system.

FIG. 5A illustrates an isometric view and FIG. 5B illustrates a side view of an exemplary roller design according to embodiments of the invention. The rollers of FIG. 5 are generally tapered from one end to an opposing end such that an outer diameter at one terminal end of the roller is larger than the outer diameter of the opposing terminal end. The outer profile along the roller from one terminal end to the opposing terminal end may be linear or curved. As shown, the minimum outer diameter occurs between the terminal ends, closer to the reduced diameter terminal end. As shown, the minimum outer diameter may occur approximately one-third to one-fourth the length of the roller from the smaller outer diameter terminal end.

FIG. 6A illustrates an isometric view and FIG. 6B illustrates a side view of an exemplary roller design according to embodiments of the invention. The rollers of FIG. 6 are similar to FIG. 5 in which the outer profile of the roller is contoured from one terminal end of the roller to an opposing end. However, the minimum outer diameter of the roller occurs in this embodiment closer to the center of the roller, such that the outer diameters of the terminal ends are approximately equal. Therefore, the outer profile of the FIG. 6 roller is generally symmetric.

Figure 7A:
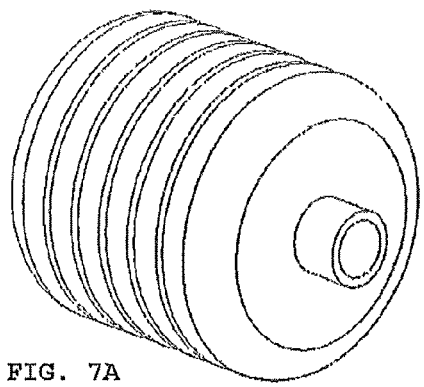
FIG. 7A illustrates an isometric view and FIG. 7B illustrates a side view of an exemplary roller design according to embodiments of the invention.
Figure 7B:
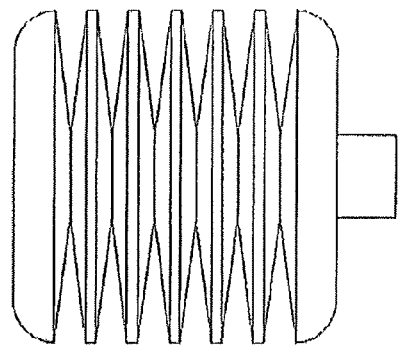

FIG. 7A illustrates an isometric view and FIG. 7B illustrates a side view of an exemplary roller design according to embodiments of the invention. The outer dimension of the FIG. 7 roller is generally constant along the roller length. Thus, the FIG. 7 roller is generally cylindrical with the cut-out portions creating local valleys for debris, juice, and water, passage.

FIG. 11 illustrates a top view of two adjacent profiled rollers according to embodiments described herein. The shaped profile corresponds to the generally cone shaped profile of a strawberry. Therefore, the outer profile starts at a maximum outer diameter toward one end of the rod. The rod profile then generally tapers nearly linearly or at a slight curve for a length to a minimum diameter outer profile. The minimum diameter outer profile may be maintained or nearly maintained for a short length or slightly increase, before a rapid increase, almost step-wise back to the maximum outer diameter. The transition then repeats gradually back to the minimum diameter and then step-wise to the maximum diameter, along the length of the rod.

Figure 14A:
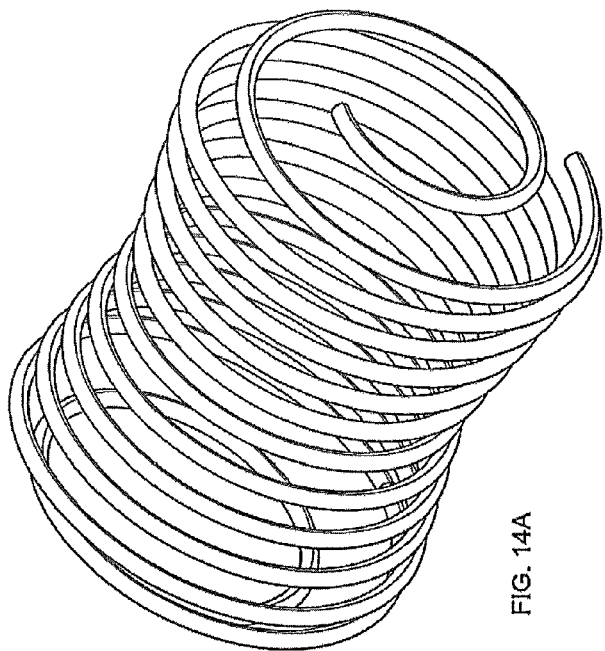
FIG. 14A illustrates an isometric view and FIG. 14B illustrates a side view of an exemplary roller design according to embodiments of the invention.
Figure 14B:
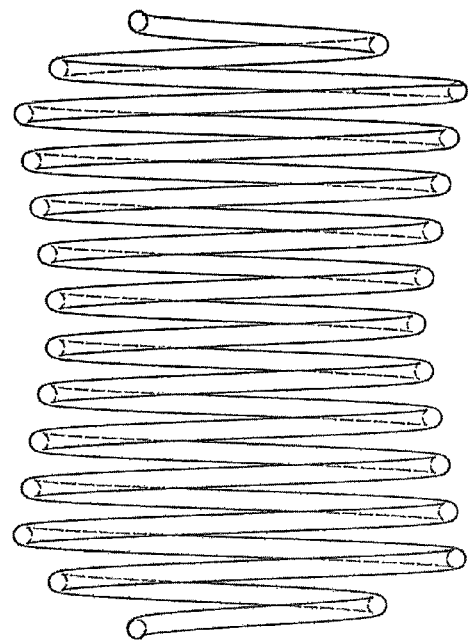

FIG. 14A illustrates an isometric view and FIG. 14B illustrates a side view of an exemplary roller design according to embodiments of the invention. The roller is configured from a helically coiled wire to create a contoured outer profile. The turns of the coil are separated to create the striated pattern along the longitudinal length of the roller. The outer dimension of the FIG. 14 roller is profiled along its length such that an outer diameter of the outer profile is greater toward the exterior longitudinal end regions than a diameter at the longitudinally central portion of the outer profile. The diameter of the extreme terminal ends is reduced such that the coil terminal ends may be attached or contact the roller rod to position the roller at a desired location along the roller rod. The wire may include a circular cross section, rectangular cross section, square cross section, or otherwise shaped to provide a desired contact surface to the strawberry, or may be a combination thereof.

Figure 15A:
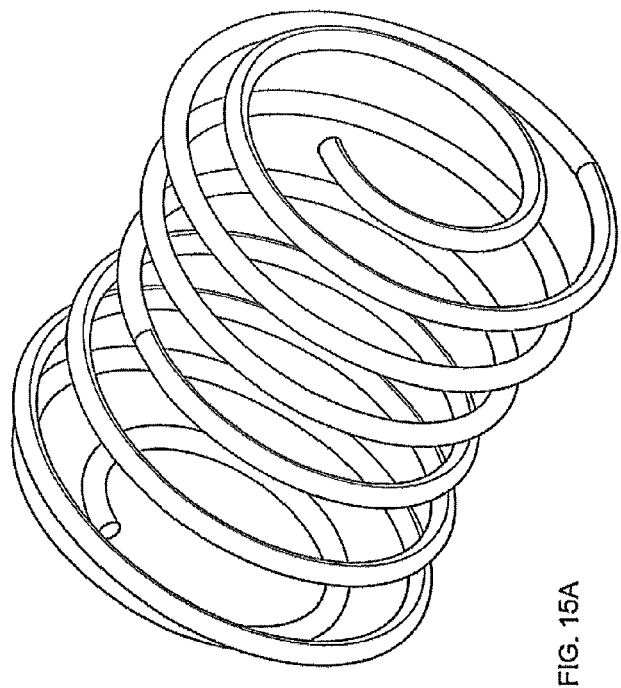
FIG. 15A illustrates an isometric view and FIG. 15B illustrates a side view of an exemplary roller design according to embodiments of the invention.
Figure 15B:
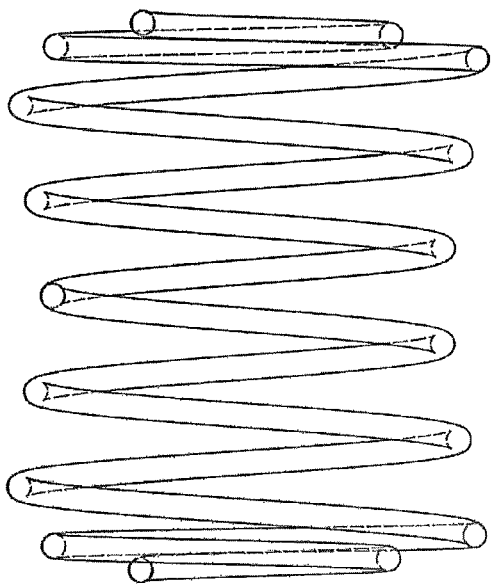

FIG. 15A illustrates an isometric view and FIG. 15B illustrates a side view of an exemplary roller design according to embodiments of the invention. FIG. 15 is similar to FIG. 14 with a greater pitch or space between adjacent turns of the wrapped coil.

Figure 16A:
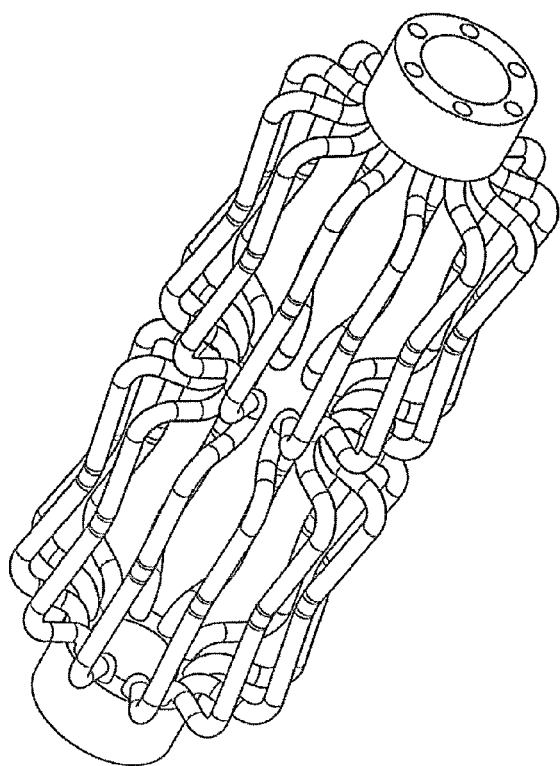
FIG. 16A illustrates an isometric view and FIG. 16B illustrates a side view of an exemplary roller design according to embodiments of the invention.
Figure 16B:
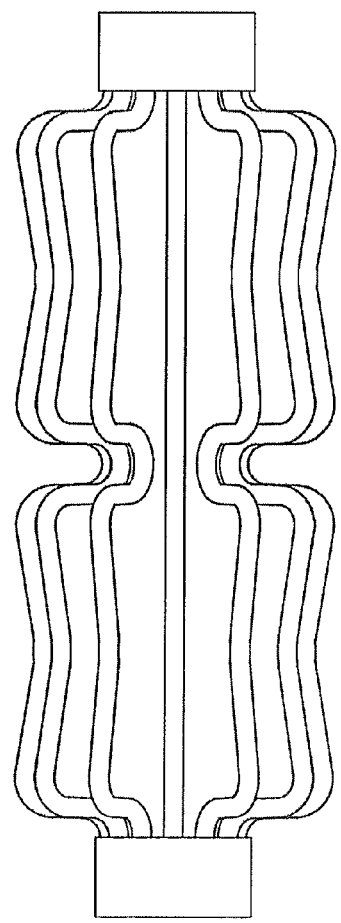

FIG. 16A illustrates an isometric view and FIG. 16B illustrates a side view of an exemplary roller design according to embodiments of the invention. FIG. 16 illustrates another exemplary embodiment of a roller comprising a wire frame. However, as opposed to the circumferentially wrapped or helically wrapped wires of FIGS. 14-15, the FIG. 16 wires are orientated generally longitudinally along an axis of the roller. Therefore, the wires are orientated generally perpendicular to the desired translational direction of travel during use. The exemplary roller of FIG. 16 includes a hub at both terminal ends to connect the wires and maintain the desired separation between adjacent wires. The hubs, as shown, include generally cylindrical collars that are sized to fit over the roller rod and maintain the roller in a desired position along the rod. The longitudinal wires are positioned circumferentially around the collars to create an outer profile of the roller. The outer profile may be any desired configuration to orient the polarized object employing embodiments of the present system. As shown, the exemplary outer profile includes two shaped sections that generally mirror each along. For example, the first half of the longitudinal length of the roller is a mirror image across a mirror plane perpendicular to the longitudinal axis at the center of the roller to the second half of the longitudinal length of the roller. The wires originate from the collar at both terminal ends of the roller, the wires then extend outwardly to a maximum diameter. The wire decreases and increases again along the longitudinal length to create a valley generally centrally to the respective first and second halves or at approximately ⅕ to ⅓ the length of the roller from the respective terminal ends of the roller. The outer profile between the first and second half, or generally at the central portion of the roller includes a decreased diameter section, thus creating a delineation between the first half and second half of the roller.

FIG. 8 illustrates an exemplary product reorientation through embodiments of the present invention.

FIG. 3 illustrates an exemplary internal view of the vision system according to embodiments of the invention. The vision system scans or images the strawberries to precisely identify the strawberry calyxes and locations. The strawberries may be tracked regardless of their positions on the conveyor enabling either random or singulated strawberry handling through the guided removal mechanisms of the removal system. Lights 16 and camera 17 are fully enclosed in this exemplary system. One or more cameras 17 may be used. A translucent low-glare polymer shield that has been treated with an anti-condensation film may be used to protect the lighting 16 and camera 17 equipment.

In an exemplary embodiment, the strawberries enter the vision system in a single layer, and one or more cameras image the fruit as it rotates on the roller conveyor. The vision system may use single shot, sequential imaging, or a continuous video imaging of the fruit as it passes the vision area. In an exemplary embodiment, an industrial Charge-Coupled Device (CCD) Camera is positioned stationary to the system above the conveyor of the loading system. The camera above the conveyor captures continuous images of strawberries in the field of view. As each fruit exits the field of view, each fruit's calyx location in coordinates will be recorded. The conveyor system may also stop the roller rotation so that each strawberry's position is fixed with no further motion except the conveyor's forward motion. The vision system may also be configured to identify and detect defects within the fruit's surface and/or diseased fruits that can be rejected and separated from the rest of the processed fruit.

The industrial color CCD camera will obtain images of each strawberry and its calyx. The calyx can be extracted by using image features, such as color, relative location to fruit shape, and other combinations of spectral imaging and geometry. Optionally, infrared imaging can identify the calyx and background removal in image processing as desired. The fruit's rotation may also be used to identify the strawberry, shape, and/or calyx.

An exemplary industrial color CCD camera records each image in 16:9 HD format. The exemplary screen ratio may be configured to correspond to the desired conveyor size. For example, the exemplary camera may be used with a conveyor approximately 36" wide, containing approximately 10 rows. Therefore, the viewing window of the camera can contain up to 24 separated strawberries along the 10 rows, or 240 strawberries. The exemplary camera can have a pixel resolution <0.5 mm (H)×0.5 mm (V)=0.25 mm$^2$/pixel for a 1,920×1,080 regular HD CCD imager. Higher resolutions or multiple cameras can be used as desired. A 10 First In First Out (FIFO) views/second rate requires approximately 20.8 megapixels/second.

Figure 9:
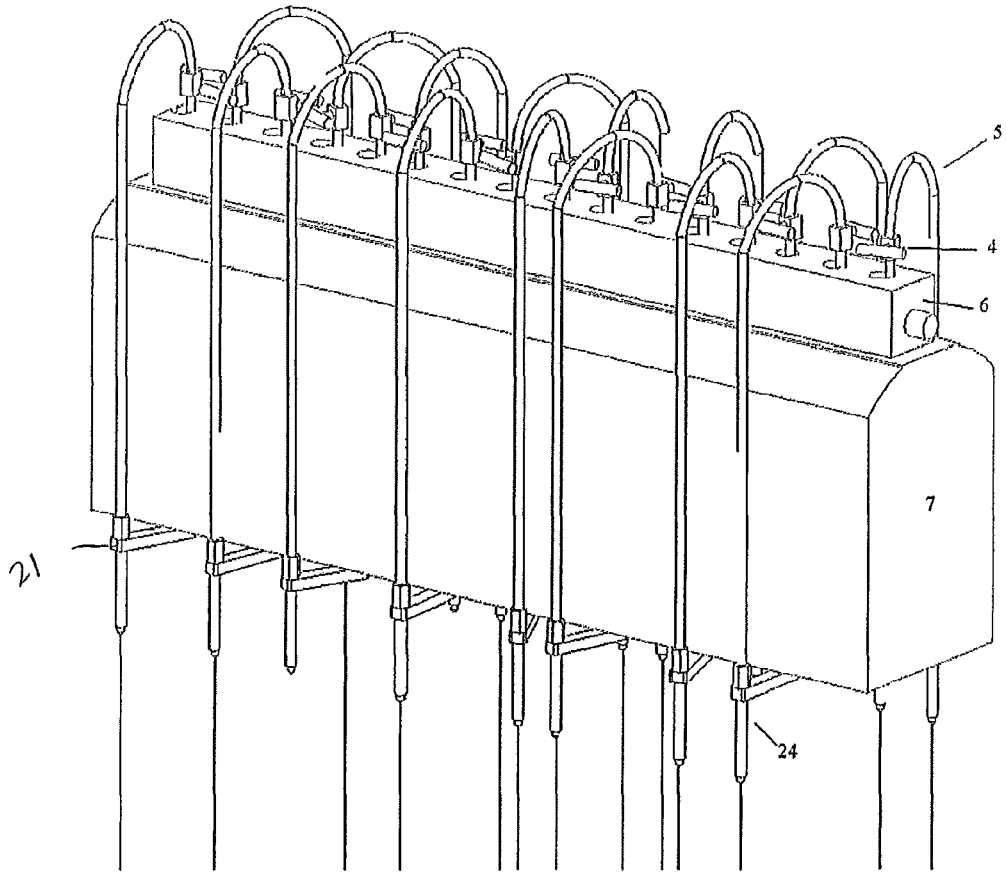
FIG. 9 illustrates an exemplary isometric view of an exemplary removal system.

FIG. 9 illustrates an exemplary isometric view of an exemplary removal system. The removal system may be any system to remove a portion of the fruit identified by the vision system. For example, the removal system may comprise a waterjet knife, impulse blade, or non-blade, non-metal cutters actuated by the vision guided computer system. In an exemplary embodiment, the removal system comprises an automated waterjet cutting system. The cutting system includes a synchronized waterjet knifes or non-blade removal system with an optional fixed or motional configuration. Because of the strawberry soft material, the calyx can be removed without too high a pump pressure. The nozzles may be fixed or mobile depending on a desired cost of the system, accuracy of cut, and desired maximization of retained fruit. The nozzle heads may be fixed and permit local motion, such that the nozzles may be translated laterally across the conveyor to remove a terminal end of the fruit, but remain in a fixed orientation. The nozzle heads may similarly be maintained in a fixed lateral position, but permit local orientation to move the jet in a conical arc to make a desired separation. Alternatively, the nozzles may be fully mobile, such that they may be translated and locally oriented to position the nozzle in any three dimensional orientation and direction. Therefore, the nozzles may comprise no translation, one-dimensional translation, two-dimensional translation, three-dimensional translation, rotational orientation, and any combination thereof. The nozzles may be configured to jet water at pressures from approximately 3 kPSI to 50 kPSI, and preferably between 25 kPSI and 35 kPSI.

As illustrated in FIG. 9, high-pressure water enters the manifold 6 and is passed to the nozzle 24 through flexible metal tubing 5. The flexible tubing allows for inexpensive implementation of axis and angle actuation of the nozzles. If a nozzle 24 is broken, the nozzle can be shut off using the water valve 4. The nozzle position may be locally positioned and/or oriented by an actuator 21, for example by an air cylinder, linear actuator, or rotary actuator. Therefore, as shown a plurality of generally fixed water jet heads can be aligned at one per row of strawberry to separate the calyx. The water jet heads may be arranged on opposing sides of the removal system 7. Each water jet head can by locally dynamically adjusted so that it will cut precisely to the calyx passing on the conveyor. For example, the removal system may communicate with the vision system to obtain the traverse location of the separation position across the row. The actuator 21 may translate the nozzle 24 across the row to the desired separation position.

Having a single nozzle corresponding one to one to a given row of strawberries for processing provides simple, fast, clean, sharp cuts safely without metal, and easily given the minimal required motion control. However, the numerous nozzles increase system cost. In an exemplary 24 waterjet unit at orifice of 1/5000 inch each (to create a "fish line" cut) at pressure of 50 kPSI may use approximately 3 gallons/min of water. Therefore, the system may include a 150 hp pump or three 50 hp pumps. To achieve a through put of approximately 120 strawberries per second, or 432,000 strawberries per hour would cost approximately $150,000.

In an exemplary embodiment, fewer waterjets may be used, such that a single waterjet nozzle is used to remove the calyx of more than one row of strawberries. Thus, the translation of any given nozzle by actuator 21 may be increased. Therefore, any single nozzle may translate similar to a plotter with one or more heads. In an exemplary system, six nozzles may be used in which each head sweeps across 4 to 6 rows, to accommodate a conveyor of approximately 24 to 36 rows. This alternative, greatly reduces the cost of water jet heads the water used per minute, and the pump requirements. However, a more robust water head motion control mechanism must be implemented which permits greater translation of any given nozzle. The water jets can be impulse at approximately 20 ms or less, such as, for example, by an air cylinder controlled valve. In an exemplary embodiment, a removal system of 6 heads can remove the calyx from 24 rows such that 144 strawberries can be processed per second.

Figure 12:
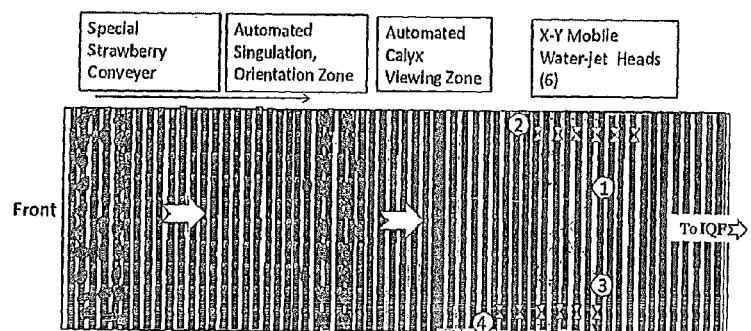
FIG. 12 illustrates an exemplary automated strawberry de-calyxing line in which a bank of six x-y mobile water jets are guided to sweep across the conveyor and cut the appropriate separation path for the calyxes.

FIG. 12 illustrates an exemplary automated strawberry de-calyxing line in which a bank of six x-y mobile water jets are synchronized by the shaft encoder and guided by the vision system control computer to sweep across the conveyor and cut the appropriate separation path for the calyxes. Each x-y mobile water jet follows the coordinates of the calyx of strawberry laying on its natural position regardless of calyx orientation. Once the system identifies and registers the coordinates of the strawberries and their respective calyx locations, the x-y mobile water jet heads may be controlled across the conveyor to follow a calculated cut pattern or route. In order to follow the conveyor motion, the water jet heads may travel in a slight angle following the conveyor motion, as synchronized by the conveyor shaft encoder.

A cutting system comprising water jets is used herein as an exemplary configuration. Many other impulse cutting schemes can be designed and implemented without using water jets. These schemes may include rotation, linear, and stroke motional cuts controlled by actuators and the vision system processor.

The high-speed, high-pressure water jets disclosed herein may be hazardous to human interference. Thus, a protective enclosure, such as glass, silicon-coated polycarbonate, metal, or other enclosure may provide a safety barrier to human users. Windows or access portals may be provided to view and/or provide access to the interior of the system. The portals may comprise safety interlocks that automatically shut down the water jets, pumps, etc. when opened. Therefore, once an intrusion is sensed, the safety features may automatically shut off the water supply, and/or jets.

In an exemplary embodiment, the vision system 3 and calyx removal system 7 may be integrated into a combined system. This integration may use one or more computer and/or processor including, for example, an imaging processor, to control the vision system, including the camera, the loading system, including the conveyor rollers, and the removal system, including the actuated nozzles. The system may track the roller coordinates, for example through the conveyor shaft encoder, analyze and detect the orientation and configuration of the strawberry to determine the coordinates of the calyx for removal through the detection of one or more images from the vision system, and position and/or orient the nozzles as well as pulse the jet to make a desired separation of the calyx from the strawberry in the removal system. The system may include one or more input and output interfaces, including a user control and interface, an output control, interfaces between the machine controller, encode, any safety sensors, signal pre-processors, cameras, nozzle valves, nozzle actuators, etc.

Figure 10:
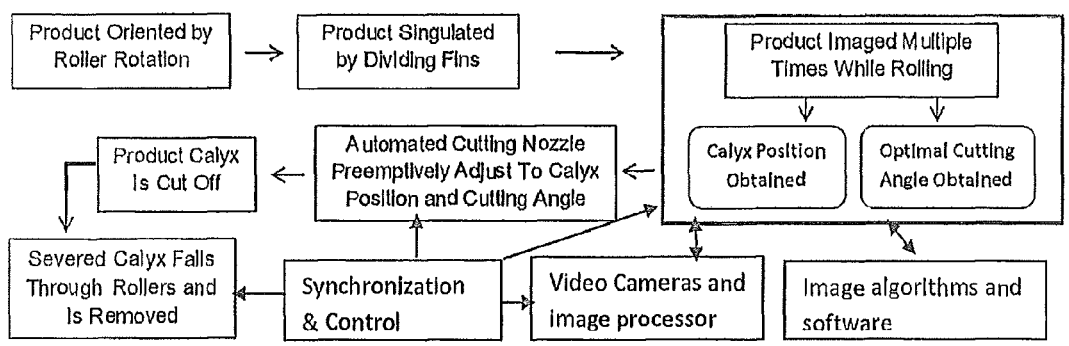
FIG. 10 illustrates an exemplary flow chart for the automated system according to embodiments described herein.

FIG. 10 illustrates an exemplary flow chart for the automated system according to embodiments described herein.

First, the strawberries are loaded from the optional flown tank onto the loading system, such as the disclosed rolling conveyor. The loading system preferably positions the strawberries in a single layer that orients regular strawberries sideways based on their natural shapes and rolling friction. The loading system may also singulate the strawberries into rows by one or more dividing fins and/or by the configuration of the roller configuration.

Next, the strawberries traverse the vision system to identify the calyx of each rolling strawberry. In an exemplary embodiment, industrial cameras take continuous and/or repetitious sequential images. The vision system takes and analyzes the images to identify and locate the respective calyxes. The processor associated with the vision system or a processor associated with another part of the system, such as the removal system, may take the data regarding the calyx locations and/or strawberry location and/or orientation and calculate or determine an optimal cutting angle for the removal system. The vision system comprises both hardware including the video and/or still cameras, imaging processor, and/or algorithm processor, as well as software stored as non-volatile machine readable medium and executed by one or more of the processors to perform the imaging algorithms and associated calculations. As the strawberries leave the vision system, the location and/or orientation may be determined, and the strawberries are no longer rolled, but are maintained in a stationary rotational position, but laterally traversed along the conveyor and into the calyx removal section. The strawberries may be tracked by a conveyor shaft encoder and therefore the system may register each calyx's precise position (within for example approximately+/−0.25 mm) in coordinates.

While the strawberries traverse the removal system, the calyx is removed from the strawberry. The removal system is synchronized by the conveyor shaft encoder to track to location of the calyx, while the removal actuators take the coordinates obtained from the vision system and remove each calyx. The removal system may include any combination of different removal systems, such as mechanical, optical, hydro, etc. As described herein, actuators are orientated according to the calculations from the vision system to automate the cutting nozzle and preemptively adjust to the calyx position and desired cutting angle. The actuators then remove the calyx from the strawberry. The severed calyx are removed from the system, for example by falling through rollers and/or spaces in the conveyor system and removed on a separate conveyor system, while the calyx free strawberries are conveyed onto further processing, such a freeze drying.

Exemplary embodiments may include one or more sensors on an output side of the removal system to detect and/or remove any strawberries that retain any or all of their calyx or have another other blemished attributes caused by the system.

Exemplary embodiments as described herein are generally in terms of strawberries that are automatically oriented and/or located by the loading system. Therefore, if strawberries are of abnormal size or shape, such as double coned or substantially flat, the loading system as described may not properly orient the strawberries. The system may be configured to respond to these strawberries in a number of ways. For example, the vision system may be configured to identify the strawberries not properly oriented and/or configured. These strawberries may be removed from the system through a removal mechanism or separation mechanism. These strawberries may be removed from the system through a separate conveyor to be processed by other methods, such as by hand. Alternatively, or in addition thereto, the system may recognize these strawberries, and differently orient and/or actuate the removal system to properly configured the removal system to these strawberries and still permit proper removal. The loading system, for example, may not require orientation of the strawberries. Therefore, the differently shaped or sized strawberries may be processed by a configuration in which the vision and removal systems work without the associated rotation and/or orientation of the strawberries. For example, the vision system may position one or more cameras within the interior of the vision system to provide multiple angled images of the same strawberry, thus replacing the rotation of the strawberry, as described above, to obtain a semi-complete image of the strawberry for recognizing the calyx. The removal system may then be configured to actuate the nozzle to a starting separation location and traverse or angle the nozzle to an ending separation location accounting for the translation of the strawberry, if any, through the system. Thus, the system can be configured to determine the entire separation path between the calyx and the strawberry and not simply a terminal end segment or lateral coordinate to initiate the separation and permit the translation from the conveyor to complete the separation. Therefore, the strawberry may be oriented in any configuration in which the calyx is on any lateral side of the strawberry, and the separation may be achieved at any lateral or angular orientation as necessary.

Embodiments as described herein may reduce labor time and costs in the fields by removing the pre-processing of calyx from the strawberries by manual labor. Moreover, worker safety and therefore worker availability may be improved. Workers may be more easily found as they will not have to work with sharp and unsafe equipment. The pay incentive for field workers also dictates faster production, thus potentially incentivizing unsafe or inefficient use of their cutting tools, thereby reducing worker safety. Therefore, by removing the calyx removal from the fields and manual labor, the overall safety to the worker improves. Sanitation of the cutting implements and fruit may also be improved as the cutting is removed from outside, uncontrolled, generally warm conditions, and into a facilities, regularly available to cleaning, Moreover, the speed of processing may be greatly increased, and the field-to freezer time greatly reduced. A reduction is processing costs based on the reduced time, higher throughput, increased fruit yield, improved worker safety, and other considerations may also competitively improve the manufacturing taking advantages of embodiments described herein.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

While some specific embodiments of the invention have been shown the invention is not to be limited to these embodiments. For example, specific configurations of the loading system, vision system, and/or calyx removal system are provided. However, the described embodiments may be integrated, separated, removed, duplicated, added, modified, or combined such that any feature described herein may be used with any of the disclosed embodiments. Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:

1. A computer controlled strawberry pre-processing system, comprising:
    a vision system for sequentially imaging strawberries, the vision system configured to detect the location of the calyx for removal;
    a calyx removal system for separating the calyx from the strawberry based on the detected location from the vision system; and
    a loading system including a water tank and conveyor system to remove strawberries from the water tank and transport the strawberries through the vision system and calyx removal system, the conveyor system configured to rotate the strawberries along at least a portion of the transportation through the vision system wherein the loading system comprises a frame including a track having an inclined section and a generally horizontal section, and a plurality of rods positioned along the track, the rods laterally movable from one end of the track to an opposing end of the track to laterally transport the strawberries through the pre-processing system.

2. A computer controlled strawberry pre-processing system, comprising:
    a vision system for sequentially imaging strawberries, the vision system configured to detect the location of the calyx for removal;
    a calyx removal system for separating the calyx from the strawberry based on the detected location from the vision system;
    a loading system including a water tank and conveyor system to remove strawberries from the water tank and transport the strawberries through the vision system and calyx removal system, the conveyor system configured to rotate the strawberries along at least a portion of the transportation through the vision system wherein the loading system comprises a frame including a track having an inclined section and a generally horizontal section, and a plurality of rods positioned along the track, the rods laterally movable from one end of the track to an opposing end of the track to laterally transport the strawberries through the pre-processing system; and
    wherein the plurality of rods comprise a profiled outer perimeter configured to position and orient the strawberries in a desired pattern, at least a portion of the profiled outer perimeter includes a generally circumferential striated pattern along a longitudinal length of the profiled outer perimeter.

3. A computer controlled strawberry pre-processing system, comprising:
    a vision system for sequentially imaging strawberries, the vision system configured to detect the location of the calyx for removal;
    a calyx removal system for separating the calyx from the strawberry based on the detected location from the vision system;
    a loading system including a water tank and conveyor system to remove strawberries from the water tank and transport the strawberries through the vision system and calyx removal system, the conveyor system configured to rotate the strawberries along at least a portion of the transportation through the vision system wherein the loading system comprises a frame including a track having an inclined section and a generally horizontal section, and a plurality of rods positioned along the track, the rods laterally movable from one end of the track to an opposing end of the track to laterally transport the strawberries through the pre-processing system; and
    wherein the plurality of rods comprise a profiled outer perimeter configured to position and orient the strawberries in a desired pattern, at least a portion of the profiled outer perimeter includes a generally circumferential striated pattern along a longitudinal length of the profiled outer perimeter and further wherein the profiled outer perimeter comprises shaped rollers positioned along shafts of the rods.

4. A computer controlled strawberry pre-processing system, comprising:
    a vision system for sequentially imaging strawberries, the vision system configured to detect the location of the calyx for removal;
    a calyx removal system for separating the calyx from the strawberry based on the detected location from the vision system;
    a loading system including a water tank and conveyor system to remove strawberries from the water tank and transport the strawberries through the vision system and calyx removal system, the conveyor system configured to rotate the strawberries along at least a portion of the transportation through the vision system wherein the loading system comprises a frame including a track having an inclined section and a generally horizontal section, and a plurality of rods positioned along the track, the rods laterally movable from one end of the track to an opposing end of the track to laterally transport the strawberries through the pre-processing system; and wherein the plurality of rods comprise a profiled outer perimeter configured to position and orient the strawberries in a desired pattern, at least a portion of the profiled outer perimeter includes a generally circumferential striated pattern along a longitudinal length of the profiled outer perimeter wherein the rods comprise a frictional engagement surface that contacts a portion of the frame such that when the frictional engagement surface is in contact with the frame and the rod is translated along the frame the rods rotate and when the frictional engagement surface is not in contact with the frame and the rod is translated along the frame the rod does not rotate.

* * * * *